United States Patent
Murphy

(10) Patent No.: US 12,538,930 B2
(45) Date of Patent: Feb. 3, 2026

(54) WEIGHT LOSS SUPPLEMENT COMPOSITION AND METHOD OF PREPARING THE SAME

(71) Applicant: John J Murphy, Stuart, FL (US)

(72) Inventor: John J Murphy, Stuart, FL (US)

( * ) Notice: Subject to any disclaimer, the term of this patent is extended or adjusted under 35 U.S.C. 154(b) by 0 days.

(21) Appl. No.: 18/613,594

(22) Filed: Mar. 22, 2024

(65) Prior Publication Data

US 2024/0349745 A1 Oct. 24, 2024

Related U.S. Application Data

(60) Provisional application No. 63/460,356, filed on Apr. 19, 2023.

(51) Int. Cl.
*A23C 13/14* (2006.01)
*A61K 31/522* (2006.01)
*A61K 35/20* (2006.01)

(52) U.S. Cl.
CPC ............ *A23C 13/14* (2013.01); *A61K 31/522* (2013.01); *A61K 35/20* (2013.01)

(58) Field of Classification Search
None
See application file for complete search history.

(56) References Cited

U.S. PATENT DOCUMENTS

| | | |
|---|---|---|
| 11,172,691 B2 | 11/2021 | Kizer |
| 2007/0128323 A1 | 6/2007 | Tsujii |
| 2007/0172474 A1 | 7/2007 | Zemel |
| 2019/0216106 A1 | 7/2019 | Geistlinger |
| 2020/0154753 A1 | 5/2020 | Barata |
| 2020/0331958 A1 | 10/2020 | Prakash |
| 2022/0159984 A1 | 5/2022 | Ernult |
| 2022/0213438 A1 | 7/2022 | Lin |

FOREIGN PATENT DOCUMENTS

| | | | | |
|---|---|---|---|---|
| GB | 2437239 A | * | 10/2007 | ............ A23C 13/14 |
| WO | 2013122465 A1 | | 8/2013 | |

OTHER PUBLICATIONS

Havranek ("How Does Caffeine Affect Gut Health?" (2020) https://russellhavranekmd.com/caffeine-affect-gut-health/).*
"Healthy Whipped Cream" article (https://web.archive.org/web/20221117191420/https://amyshealthybaking.com/blog/2022/11/16/healthy-whipped-cream/—internet archived version from Nov. 16, 2023).*
Shi (CN 108576149 A—English translation) 2018.*
"Egg Nutrition Facts"; https://eggs.ab.ca/healthy-eggs/egg-nutrition/; accessed Jul. 2024.*
"Lactase drops" (https://web.archive.org/web/20220704053142/https://www.intoleran.com/US/product/lactase-drops-14-ml/—internet archived version from Jul. 4, 2022).*
Laws ("Berry smoothie designed to make cod liver oil more palatable." Apr. 4, 2002. https://www.nutraingredients.com/Article/2022/04/04/Berry-smoothie-designed-to-make-cod-liver-oil-more-palatable#).*
Patton ("Is It Safe to Drink 'Profee' to Jump-Start Your Day or Workout?". Sep. 27, 2021. https://health.clevelandclinic.org/should-you-drink-protein-coffee ).*
"Protein Shakes—The How To Guide" (https://web.archive.org/web/20210917164554/https://simondsmetabolics.com/2016/05/26/protein-shakes-the-how-to-guide/—internet archived version from Sep. 17, 2021).*
"Whey Protein Amino Acid Profiled—Ultimate Guide," https://shakeplease.com/blogs/news/whey-protein-amino-acid-profile ) accessed Mar. 2025.*
Lipton ("Heavy Cream Nutrition Facts and Health Benefits" https://www.verywellfit.com/heavy-cream-nutrition-facts-and-health-benefits-5189839—Jun. 2024).*

* cited by examiner

*Primary Examiner* — Susan Hoffman
(74) *Attorney, Agent, or Firm* — William J Connelly, III; Kelley Kronenberg

(57) ABSTRACT

A weight loss supplement composition is disclosed. The composition comprises a first pre-defined amount of dairy product such that the dairy product is a heavy and lactose-free whipping cream; an effective amount of sugar-free flavoring extract; and a second pre-defined amount of isolate whey protein; wherein the first pre-defined amount of the dairy product, the effective amount of the sugar-free flavoring extract, the second pre-defined amount of the isolate whey protein are mixed to a desired consistency for preparing a weight loss supplement.

13 Claims, 2 Drawing Sheets

WEIGHT LOSS SUPPLEMENT COMPOSITION AND METHOD OF PREPARING THE SAME

BACKGROUND

Field of Invention

Embodiments of the present invention generally relate to a dietary supplement composition and particularly to a weight loss supplement composition and a method of preparing the same.

Description of Related Art

Being overweight and obese are unhealthy conditions that not only decrease longevity but may be the cause of a variety of medical conditions such as heart disease, circulatory issues, diabetes, varicose veins, and so forth. In general, obesity is treated by reducing one's caloric intake and increasing one's energy consumption via exercise and the like. Further, obesity can be treated by the intake of various types of over the counter (OTC) and prescription medications to suppress appetite and increase the metabolic rate of a user. However, such medications are often ineffective and may result in undesirable effects such as insomnia, over stimulation, rapid heartbeat, high blood pressure, and so forth. To address the aforementioned issues, a variety of dietary and weigh loss supplements are being manufactured, marketed and sold to consumers claiming various health and nutritional benefits.

Conventionally, nutritional and dietary supplements (individually and collectively referred to as "supplements") are in form of tablets and/or capsules. In addition to consumers having difficulty in swallowing the tablets and/or capsules, the tablets and/or capsules often absorb slowly and take a longer time to work in the human body. Many of these nutritional and dietary supplements are often excreted by the body with limited effectiveness. In addition, many of the available nutritional and dietary supplements are prepared by adding high caloric sweetening agents that result in a weight gain instead of a weight loss.

Thus, there is a need for an improved and advanced nutritional weight loss supplement composition that overcomes the aforementioned issues more efficiently. Often, traditional weight loss supplements and dieting are associated with low caloric foods, high protein supplements and low carbohydrate diets. Conversely, the within nutritional weight loss supplement composition achieves its results and benefits through the incorporation of saturated fats.

SUMMARY

Embodiments in accordance with the present invention provide a nutritional weight loss supplement composition. The composition comprises a first pre-defined amount of a dairy product comprising heavy, lactose-free whipping cream, a second pre-defined amount of protein supplement and the addition of an effective amount of flavoring to the taste of a user. In a preferred embodiment of the present invention, the protein supplement comprises isolate whey protein. In an additional embodiment of the present invention, the composition further comprises the addition of water and/or ice cubes for desired constancy, wherein the first pre-defined amount of the dairy product, the effective amount of flavoring extract, the second pre-defined amount of the isolate whey protein, and the water are mixed and/or blended to a desired consistency to prepare a weight loss supplement in a drinking form. In a preferred embodiment of the present invention, water may be in the form of one or more ice cubes to add additional consistency and benefits to the nutritional and weight loss supplement. In an additional embodiment of the present invention, additional nutritional supplements may be added including vitamins, minerals, omega supplements and so forth. The ingredients of the nutritional weight loss supplement may be mixed by hand, shaken, stirred, or blended in a mixer to attain the desired consistency and drinkability.

Embodiments in accordance with the present invention further provide a nutritional weight loss supplement composition. In a preferred embodiment of the present invention, nutritional weight loss supplement composition comprises 2,000 calories. In other embodiments of the present invention, the nutritional weight loss supplement composition may be scaled to accommodate an individual's caloric needs. The composition comprises a first pre-defined amount of dairy product comprising heavy, lactose-free whipping cream, wherein the first pre-defined amount of the dairy product is 1 pint. The composition further comprises an effective amount of flavoring to the taste of the user. In a preferred embodiment of the present invention, the flavoring may comprise a caloric free or sugar free flavored extract. In another embodiment of the present invention, the flavoring extract may comprise a sugar free supplement comprising a sugar free nutritional bar. In yet another embodiment of the present invention, the flavoring may comprise a caloric flavoring. The composition further comprises a second pre-defined amount of isolate whey protein, wherein the second pre-defined amount of the isolate whey protein is approximately 30 grams. In an additional embodiment of the present invention, the composition further comprises the optional addition of water and/or ice for desired consistency of the nutritional weight loss supplement. In a preferred embodiment of the present invention, the first pre-defined amount of the dairy product, flavoring and the second pre-defined amount of the isolate whey protein are mixed together. In an additional embodiment of the present invention, the water and/or ice may be added for a desired consistency for preparing the nutritional weight loss supplement in a drinking form. In an additional embodiment of the present invention, additional nutritional supplements may be added including vitamins, minerals, omega supplements and so forth.

Embodiments in accordance with the present invention further provide a method for preparing a weight loss supplement composition. The method comprising steps of adding a first pre-defined amount of dairy product comprising heavy, lactose free whipping cream to a mixer; adding an effective amount of flavoring to the taste of the user; and adding a second pre-defined amount of isolate whey protein to be mixed together. In a preferred embodiment of the present invention, the first pre-defined amount of the dairy product is one (1) pint and the second pre-defined amount of the isolate whey protein is approximately 30 grams. In an additional embodiment of the present invention, water and or ice may be added for a desired consistency for preparing the nutritional weight loss supplement in a drinking form. The addition of ice may also provide the added benefit of preparing the nutritional weight loss supplement in the form of a smoothie when mixed in a blender. In a preferred embodiment of the present invention, the flavoring is a caloric free or sugar free extract. In another embodiment of the present invention, the flavoring may comprise a sugar free supplement comprising a sugar free nutritional bar. In yet another embodiment of the present invention additional nutritional supplements may be added including vitamins, minerals, omega supplements and so forth.

Embodiments of the present invention may provide a number of advantages depending on its particular configuration. First, embodiments of the present application may provide a weight loss supplement composition.

Next, embodiments of the present application may provide a nutritional and weight loss supplement composition that may satisfy hunger, thereby killing appetite for an extended period of time.

Next, embodiments of the present application may provide a nutritional weight loss supplement composition that is in a liquid form or a frozen form.

Next, embodiments of the present application may provide a nutritional weight loss supplement composition having a caloric and nutritional content satisfying a user's desire to eat, while at the same time, providing the user with a daily source of nutrition inclusive of all necessary vitamins, minerals and amino acids.

Next, embodiments of the present application may provide a nutritional weight loss supplement composition that may diminish appetite by nourishing the human body, diminishing the desire to overeat and producing weight loss.

Next, embodiments of the present application may provide a nutritional weight loss supplement composition that may be gluten-free and contains zero-calorie sweeteners (also referred to as a sweetener agent) and no trans fats.

Next, embodiments of the present application may provide a nutritional weight loss supplement composition that may provide a user a daily caloric intake along with a daily source of nutrition inclusive of all necessary vitamins, minerals and amino acids.

Next, embodiments of the present application may provide a nutritional weight loss supplement composition that may be anti-inflammatory and disease-fighting.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
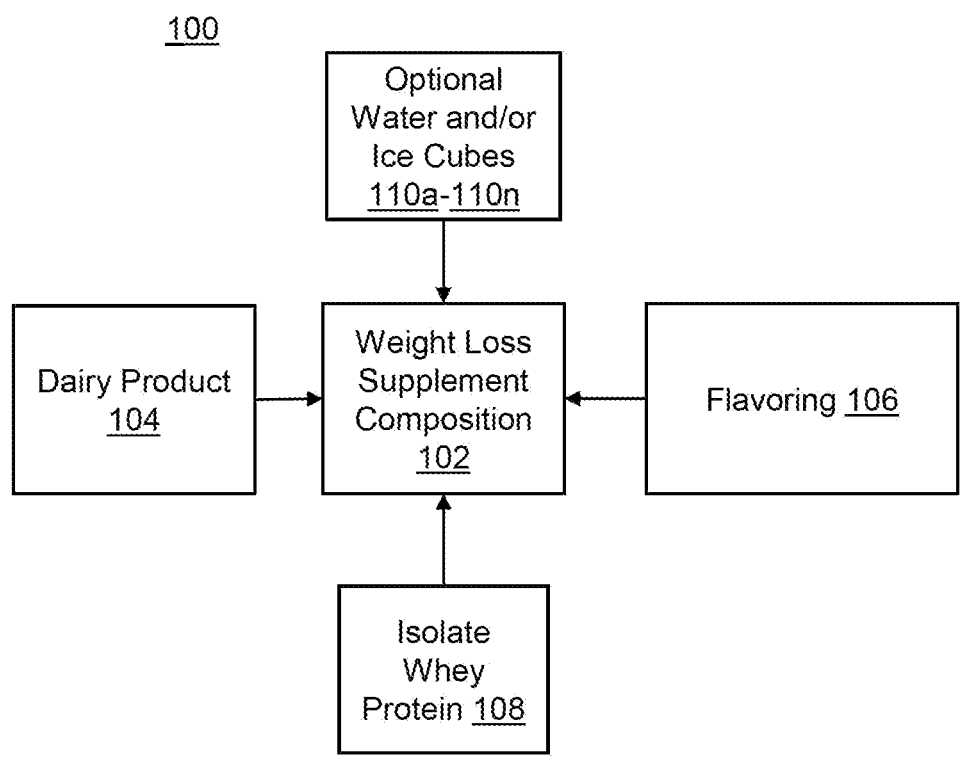
FIG. 1 illustrates a block diagram depicting a weight loss supplement composition, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined in the appended description.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary weight loss supplement composition. Embodiments of the present invention are not limited to any particular type of a weight loss supplement composition. Those skilled in the art will recognize the disclosed techniques may be used in any weight loss supplement composition.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a block diagram 100 depicting a nutritional weight loss supplement composition 102, according to an embodiment of the present invention. According to embodiments of the present invention, the weight loss supplement composition 102 may be prepared for one or more users (hereinafter collectively referred to as the users and individually referred to as the user) for both nutrition and losing weight. In an embodiment of the present invention, ingredients used in the weight loss supplement composition 102 may satisfy hunger, thereby killing appetite for an extended period of time. Further, in an embodiment of the present invention, the weight loss supplement composition 102 may be in a drinking form. In another embodiment of the present invention, the weight loss supplement composition 102 may be in a semi frozen form that may be referred to as a smoothie. In another embodiment of the present invention, the nutritional weight loss supplement may be frozen in the form of ice cream.

In an embodiment of the present invention, the nutritional weight loss supplement composition 102 may provide all requisite calories that a user may require in a single day with the added nutritional benefits of, including but not limited to, vitamins, minerals, amino acids and no added sugar. In addition, the ingredients contained within the nutritional weight loss supplement composition may be increased or decreased and scaled in a similar ratio to accommodate an increased or decreased caloric need of the user. For example, if 30 grams of whey protein are used for a 2,000-calorie nutritional weight loss supplement composition, 15 grams of whey protein would be used for a 1,000-calorie nutritional weight loss supplement composition. In the alternative, if one were to make a 3,000-calorie nutritional weight loss supplement composition, 45 grams of whey protein would be incorporated into the nutritional weight loss supplement composition. Further, in an embodiment of the present invention, the weight loss supplement composition 102 may diminish appetite by nourishing human body while depressing the desire to overeat resulting in weight loss for the user. The weight loss supplement composition 102 may be anti-inflammatory and thus may fight diseases, in an embodiment of the present invention. Further, in an embodiment of the present invention, the weight loss supplement composition 102 may be gluten-free. The weight loss supplement composition 102 may contain zero-calorie sweeteners and no trans fats, in an embodiment of the present invention. The zero-calorie sweetener, also interchangeably referred to as sweetener agent, may be, but not limited to, stevia, saccharin, and so forth, in an embodiment of the present invention. Embodiments of the present invention are intended to include or otherwise cover any type of zero-calorie sweeteners including known related art and/or later-developed technologies. In additional embodiments of the present invention, a caloric sweetener may be used.

Further, in an embodiment of the present invention, the nutritional weight loss supplement composition 102 may provide approximately 2,000 calories along with essential amino acids. In an embodiment of the present invention, the amino acids may be, but not limited to, Alanine, Arginine, Aspartic Acid, Cysteine, Glutamic Acid, Glycine, Histidine, Isoleucine, Leucine, Lysine, Methionine, Phenylalanine, Proline, Serine, Threonine, Tryptophan, Tyrosine, Valine, and so forth. Embodiments of the present invention are intended to include or otherwise cover any type of amino acids including known related art and/or later developed technologies.

According to embodiments of the present invention, the nutritional weight loss supplement composition 102 may comprise ingredients such as, but not limited to, a first pre-defined amount of dairy product 104, an effective amount of flavoring 106, a second pre-defined amount of isolate whey protein 108. At the discretion of the user and in an additional embodiment of the present invention, water and/or ice may be added and mixed or blended to a desired consistency and drinkability. In the preferred embodiment of the present invention, the water is in the form of one or more ice cubes 110a-110n (hereinafter referred to as the ice cubes 110).

In an embodiment of the present invention, the dairy product 104 may comprise, but is not limited to, a heavy and a lactose-free whipping cream that may be an enriched dairy product separated from regular milk. Contrary to a traditional dietary supplement, although heavy lactose-free whipping cream may be rich in calories from saturated fat, it may be associated with weight loss. In another embodiment of the present invention, the dairy product 104 may comprise a crème fraiche, coffee cream, sour cream and so forth. Embodiments of the present invention are intended to include or otherwise cover any type of dairy product 104 that helps in reducing weight including known related art and/or later developed technologies.

Whey protein is known as a complete protein containing all nine essential amino acids. There are three main types of whey protein, namely concentrate, isolate and hydrolysate.

In a preferred embodiment of the present invention, the protein supplement comprises isolate whey protein.

While heavy lactose free whipping cream comprises mostly saturated fat, it is also rich in choline, fat soluble vitamins and certain minerals. For example, one half cup of liquid heavy lactose free whipping cream contains, but is not limited to, approximately 408 calories, 3 grams of protein, 43 grams of fat, 3 grams of carbohydrates, 55% daily allowance of vitamin A, 10% daily allowance of vitamin D, 7% daily allowance of vitamin E, 6% daily allowance of calcium, 6% daily allowance of phosphorus, 4% daily allowance of choline and 3% daily allowance of vitamin K.

Further, in an embodiment of the present invention, the flavoring 106 may be, but not limited to, caloric sweetener, non-caloric sweetener, sugar free sweetener, a sugar-free almond extract, a sugar-free apple extract, a sugar-free apricot extract, and so forth. In a preferred embodiment of the present invention, the sugar free flavoring may comprise a sugar free nutritional bar or any sugar free product to provide additional flavoring and nutrition to the nutritional weight loss supplement. Embodiments of the present invention are intended to include or otherwise cover any type of sugar-free flavoring extract 106 including known related art and/or later developed technologies.

In an embodiment of the present invention, the isolate whey protein 108 may be a highly concentrated and filtered form of whey for the nutritional weight loss supplement.

Further, in an embodiment of the present invention, the nutritional weight loss supplement composition 102 may include additional ingredients including, but not limited to, additional nutritional supplements including vitamins, minerals, omega supplements, butter, eggs, caffeine, and so forth. Embodiments of the present invention are intended to include or otherwise cover any type of additional ingredients that may help in providing nutrition and weight loss to a user including known related art and/or later-developed technologies.

In an embodiment of the present invention, the nutritional weight loss supplement composition 102 may comprise an average user's daily caloric intake for reducing and controlling weight. In an embodiment of the present invention, the components of the nutritional weight loss supplement may be modified dependent on the user's weight and daily caloric requirement. Caloric intake may be further broken down as fat, carbohydrates and protein. For example, in a traditional daily caloric intake of 2,000 calories, a majority of those calories may comprise upwards of 60% or more of carbohydrates with the remaining calories coming from protein and fat. In a preferred embodiment of the present invention, the nutritional weight loss supplement can best be classified as low-carb and is essentially carbohydrate free comprising a total digestible carbohydrate content of approximately three (3) grams or less in a typical 16 to 18 ounce serving. In yet another preferred embodiment of the present invention, a majority of the calories comes from the saturated fat content of the nutritional weight loss supplement.

Traditionally, the recommended daily intake of carbohydrates is 45% to 65% of total calories, or between 225 and 325 grams for a 2,000 a day diet. Fat produces 9 calories per gram while protein and carbohydrates produce 4 calories per gram. In an embodiment of the present invention, despite being higher in caloric content, saturated fat is a key ingredient in satisfying a user's appetite while at the same time virtually eliminating carbohydrates and supplementing same with 25 to 30 grams of protein. In a preferred embodiment of the present invention, additional sugar or sugar free sweeteners along with nutritional vitamins may be added to enhance flavor and nutritional content.

Further, in an embodiment of the present invention, the nutritional weight loss supplement composition 102 comprises a first amount of the dairy product 104 of one (1) pint or its equivalent of 473 milliliters (mL).

In an embodiment of the present invention, the nutritional weight loss supplement may comprise a series of supplements, namely a first nutritional supplement composition, a second nutritional supplement composition and a third nutritional supplement composition. In another embodiment of the present invention, first nutritional supplement composition is considered to be the first or beginning nutritional weight loss supplement, to be followed by a second nutritional weight loss supplement to maintain weight loss, and a third nutritional weight loss supplement for added energy. In a preferred embodiment of the present invention, each of the noted supplement compositions comprise, but are not limited to, at least 75 milligrams of saturated fat. In other embodiments of the present invention, the noted supplement compositions may comprise, but are not limited to, 200 milligrams of saturated fat.

In an embodiment of the present invention, the first nutritional supplement composition is prepared in a manner that provides a user with the minimum required daily caloric intake in one serving. The recommended average daily caloric intake is 1,600 to 2,400 calories for women and 2,000 to 3,000 calories for men. In addition, the heavy lactose free-whipping cream provides additional nutritional value and essential amino acids including but not limited to Cystine, Histidine, Isoleucine, Leucine, Lysine, Methionine, Phenylalanine, Threonine, Tryptophan, tyrosine and Valine.

In a preferred embodiment of the present invention, the amount of heavy lactose free whipping cream can be, but is not limited to, one pint. If preferred, the amount of heavy lactose free whipping cream may be reduced and supplemented with coconut milk. For example, if the amount of heavy lactose free whipping cream were reduced to a quarter pint, the remainder three quarters pint would comprise coconut milk. In addition to the heavy lactose free-whipping cream, the first nutritional supplement composition further comprises a sweetener along with the addition of a protein supplement. In a preferred embodiment of the present invention, the first nutritional supplement comprises up to, but not limited to, 25 to 30 grams of protein, which at 4 calories per gram would equate to approximately 100 calories to 120 calories. While a user is free to add additional protein calories as desired, these calories may be adverse to potential weight loss. In a preferred embodiment of the present invention the sweetener is a zero-calorie sweetener. However, any sweetener may be used at the discretion of the user.

In an additional embodiment of the present invention, the nutritional weight loss supplement composition may comprise a second nutritional supplement composition to maintain weight loss in which at least one egg, cod liver oil and butter are added to the first nutritional weight loss supplement composition. In a preferred embodiment of the present invention, up to, but not limited to, three eggs can be added to the first nutritional weight loss supplement composition. Each egg will add approximately 150 mg of choline, 3.5 grams of fat, 150 mg of cholesterol, zero carbohydrates and 6 grams of protein. In a preferred embodiment of the present invention at least one teaspoon of cod liver is added to the first nutritional weight loss supplement composition. A teaspoon of cod liver oil provides approximately 40 calories, 4.5 grams of fat, 890 mg of Omega-3 fatty acids, 150% daily allowance of vitamin A, 113% daily allowance of vitamin D and 26 mg of cholesterol. In another embodiment of the present invention, the second nutritional supplement composition comprises cod liver oil in the range of one teaspoon to one tablespoon for ideal benefits but may be added to the desired taste of a user. In a preferred embodiment of the present invention at least one or more tablespoons of butter are also added to the first nutritional weight loss supplement composition. The tablespoon of butter provides approximately 100 fat calories, 0% carbohydrates and 0% protein. In another embodiment of the present invention, the second nutritional supplement composition comprises butter in the range of one-half tablespoon to one and one half tablespoon for ideal benefits but may also be added to the desired taste of a user.

In an additional embodiment of the present invention, the nutritional weight loss supplement composition may comprise a third nutritional supplement composition wherein caffeine is added to the second or maintenance supplement composition. The amount of caffeine added may depend on a user's tolerance for caffeine intake. In a preferred embodiment of the present invention, the third nutritional supplement composition comprises caffeine in the range of 30 mg to 200 mg for ideal benefits but may be added to the desired taste of a user.

Further, in an embodiment of the present invention, all of the ingredients of the above described nutritional supplements such as, the first pre-defined amount of the dairy product 104, flavoring 106, and the second pre-defined amount of the isolate whey protein 108 may be combined and mixed in a mixer to a desired consistency. In an additional embodiment of the present invention, water and/or ice may be added to a desired consistency and drinkability. In an embodiment of the present invention, the ice cubes 110 may be added in a solid form to the mixer and blended to form a smoothie drink. The ice cubes 110 may be crushed before adding in the mixer, in an embodiment of the present invention.

In an embodiment of the present invention, the mixer may be, but not limited to, an agitator, a manual mixer, a mechanical blender, and so forth. Embodiments of the present invention are intended to include or otherwise cover any type of the mixer, including known, related art, and/or later developed technologies. In an embodiment of the present invention, the mixer may be rotated at a pre-defined speed for a pre-defined time to prepare the nutritional weight loss supplement composition 102 to a desired consistency for drinking.

In an embodiment of the present invention, the aforementioned nutritional weight loss supplement composition 102 may be taken by the user once a day as a meal replacement. In another embodiment of the present invention, the nutritional weight loss supplement may provide the user with a full day of calories and nutritive value to further suppress appetite. However, it may be appreciated that varying dosage frequency such as once a day, may be contemplated depending upon a subject's particular needs.

In an embodiment of the present invention, the nutritional weight loss supplement composition 102 may be prepared by the user for a single-time consumption. The weight loss supplement composition 102 may further be prepared for a multi-time consumption (long-term consumption), in another embodiment of the present invention. In an embodiment of the present invention, for the multi-time consumption, the user may multiply a proportion of the first pre-defined amount of dairy product 104, the effective amount of flavoring 106, and the second pre-defined amount of isolate whey protein 108 for preparation of the weight loss supplement composition 102 for the multi-time consumption. In an additional embodiment of the present invention, the respective amount of water and/or ice cubes 110 that may be utilized for preparation of the weight loss supplement composition 102 for the multi-time consumption. The multiplied proportion may be equal to the number of times the nutritional weight loss supplement composition 102 may be consumed by the user, in an embodiment of the present invention.

In another embodiment of the present invention, the nutritional weight loss supplement comprising a first pre-defined amount of the dairy product 104, flavoring 106, and the second pre-defined amount of the isolate whey protein 108 are combined and packaged in a powder form is in powder form to be reconstituted as a drinkable nutritional weight loss supplement. In another embodiment of the present invention, the nutritional weight loss supplement in powder form may be added to yogurt, applesauce and the like.

In a further embodiment of the present invention, the nutritional weight loss supplement composition 102 may include added flavoring. In a preferred embodiment of the present invention, the flavoring agents are sugar free or have reduced calorie sugar. The flavoring agents may control and/or change a flavor and/or a taste of the nutritional weight loss supplement composition 102 to the desired taste of the user, in an embodiment of the present invention. In an embodiment of the present invention, the flavoring agents may be added before mixing of the ingredients in the mixer. The flavoring agents may further be added after mixing of the ingredients, in an embodiment of the present invention. In an embodiment of the present invention, the flavoring agents may be added as per the taste of the user.

According to embodiments of the present invention, the flavoring agents include but are not limited to sugar free aromatic oils, sugar free aromatic syrups, sugar free raw extracts, sugar free flavoring oils, sugar free flavoring syrups, sugar free nutritional supplement bars and so forth. Embodiments of the present invention are intended to include or otherwise cover any type of flavoring agents, including known, related art, and/or later developed technologies.

According to embodiments of the present invention, the flavoring agents may induce the flavor and/or the taste in the weight loss supplement composition 102, such as, but not limited to, a chocolate flavor, an orange flavor, an apple flavor, a blueberry flavor, and so forth. Embodiments of the present invention are intended to include or otherwise cover any flavor and/or taste that may be induced in the weight loss supplement composition 102 by the flavoring agents, including known, related art, and/or later developed technologies.

In another embodiment of the present invention, for weight loss, the desired flavoring is sugar and caloric free. However, any form of flavoring may be used to the taste of the user including caloric sweeteners and sweeteners containing sugar.

Figure 2:
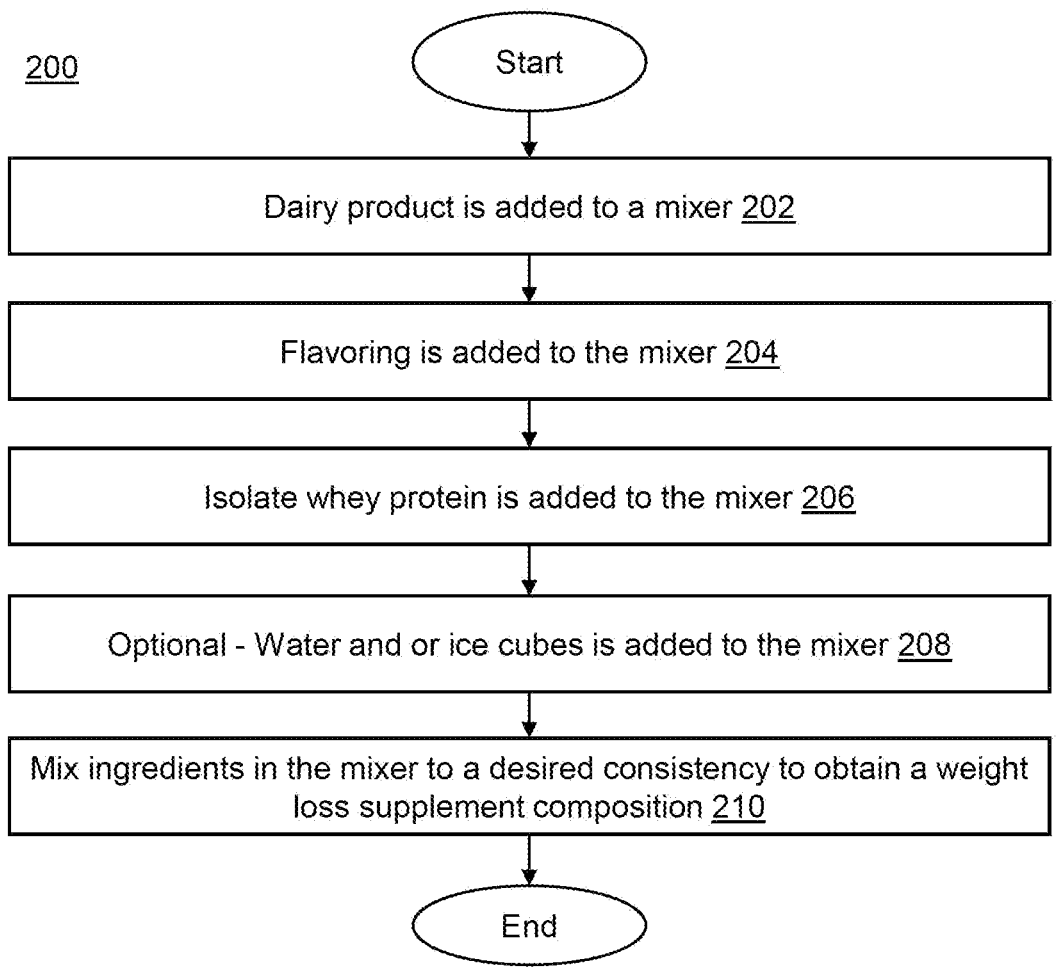
FIG. 2 illustrates a flowchart of a method for preparing the weight loss supplement composition, according to an embodiment of the present invention.

FIG. 2 illustrates a flowchart of a method 200 for preparing a 2,000-calorie nutritional weight loss supplement composition 102, according to an embodiment of the present invention.

At step 202, the first pre-defined amount of the dairy product 104 comprising heavy, lactose free whipping cream is added to the mixer wherein the first pre-defined amount of the dairy product 104 can be, but is not limited to, one (1) pint.

At step 204, a flavoring 106 is added to the mixer.

At step 206, the second pre-defined amount of the isolate whey protein 108 is added to the mixer such that the second pre-defined amount of the isolate whey protein 108 is up to, but not limited to, 30 grams.

At step 208, at the user's discretion, water and/or ice cubes may be added to the mixer for consistency and drinkability. If water and ice are not added the user would proceed to step 210.

At step 210, the ingredients are mixed to the desired consistency to obtain the nutritional weight loss supplement composition 102 in the drinking form.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the detailed description be construed to cover all such equivalent variations as fall within the true spirit and scope of the invention.

The exemplary embodiments of this present invention have been described in relation to a weight loss supplement composition. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps, whether or not such alternate, interchangeable and/or equivalent structures, functions, ranges or steps are disclosed herein, and without intending to publicly dedicate any patentable subject matter.

What is claimed is:

1. A drinkable nutritional weight loss supplement comprising:
   heavy lactose-free whipping cream, wherein the heavy lactose-free whipping cream includes at least a fifty percent daily allowance of vitamin A and at least a ten percent daily allowance of vitamin D, wherein the heavy lactose-free whipping cream includes cystine, histidine, isoleucine, and leucine;
   a plurality of supplement compositions each having at least seventy-five milligrams of saturated fat, wherein at least one of the supplement compositions includes exactly two hundred milligrams of saturated fat for appetite suppression;
   a protein supplement that includes fifteen grams of whey protein proportioned for every one thousand calories, wherein the proportion of the fifteen grams of the whey protein to every one thousand calories provides the appetite suppression and anti-inflammatory effects;
   amino acids that include Alanine, Arginine, Aspartic Acid, and Cysteine;
   a carbohydrate content of three grams or less; and
   a sweetener agent, wherein a combination of fat soluble vitamins, minerals, and saturated fat are incorporated to suppress or diminish an appetite of one or more users.

2. The drinkable nutritional weight loss supplement of claim 1 further comprising one or more pints of the heavy lactose-free whipping cream.

3. The drinkable nutritional weight loss supplement of claim 1, wherein the protein supplement comprises isolate whey protein.

4. The drinkable nutritional weight loss supplement of claim 1, wherein the sweetener agent is a reduced or zero-calorie sweetener.

5. The drinkable nutritional weight loss supplement of claim 1, further comprising an egg, cod liver oil and butter.

6. The drinkable nutritional weight loss supplement of claim 5, further comprising caffeine.

7. A drinkable nutritional weight loss supplement comprising:
   lactose-free whipping cream, wherein the heavy lactose-free whipping cream includes at least a fifty percent daily allowance of vitamin A and at least a ten percent daily allowance of vitamin D, wherein the heavy lactose-free whipping cream includes cystine, histidine, isoleucine, and leucine;
   a plurality of supplement compositions each having at least seventy-five milligrams of saturated fat, wherein at least one of the supplement compositions includes exactly two hundred milligrams of saturated fat for appetite suppression;
   isolate whey protein that includes fifteen grams of the whey protein proportioned for every one thousand calories, wherein the proportion of the fifteen grams of the whey protein to every one thousand calories provides the appetite suppression and anti-inflammatory effects;
   amino acids that include Alanine, Arginine, Aspartic Acid, and Cysteine;
   a carbohydrate content of three grams or less;
   a zero-calorie or reduced calorie sweetener agent;
   one or more eggs;
   cod liver oil; and
   butter, wherein a combination of fat soluble vitamins, minerals, and saturated fat are incorporated to suppress or diminish an appetite of one or more users.

8. The drinkable nutritional weight loss supplement of claim 7, further comprising one or more pints of the lactose-free whipping cream.

9. The drinkable nutritional weight loss supplement of claim 7, further comprising 25 mg to 35 mg of isolate whey protein.

10. The drinkable nutritional weight loss supplement of claim 7, comprising 2,000 calories or less.

11. The drinkable nutritional weight loss supplement of claim 7, further comprising a teaspoon to a tablespoon of cod liver oil.

12. The drinkable nutritional weight loss supplement of claim 7, further comprising 30 mg to 200 mg of caffeine.

13. The drinkable nutritional weight loss supplement of claim 12, wherein heavy lactose-free whipping cream, isolate whey protein, zero-calorie sweetener agent, egg, cod liver oil and caffeine are scalable to accommodate a specific caloric need of a user.

* * * * *